United States Patent [19]

Roberson, Jr.

[11] Patent Number: 4,971,293

[45] Date of Patent: Nov. 20, 1990

[54] CABLE PULLING DEVICE

[76] Inventor: John Roberson, Jr., 5215 San Jose Blvd., #105, Jacksonville, Fla. 32207

[21] Appl. No.: 319,736

[22] Filed: Mar. 7, 1989

[51] Int. Cl.⁵ .............................................. B65H 51/10
[52] U.S. Cl. ................................... 254/265; 226/188
[58] Field of Search ................ 254/265; 226/186, 187, 226/188, 190, 193

[56] References Cited

U.S. PATENT DOCUMENTS

| | | | |
|---|---|---|---|
| 2,670,926 | 3/1954 | Sewell | 226/186 |
| 2,947,516 | 8/1960 | Jackson | 226/187 X |
| 3,713,301 | 1/1973 | Bryant | 226/187 X |
| 3,871,618 | 3/1975 | Funk | 226/187 X |
| 4,264,026 | 4/1981 | Pomeret | 226/187 X |
| 4,692,569 | 9/1987 | Winner | 226/187 X |
| 4,828,223 | 5/1989 | Russell | 254/265 |

Primary Examiner—Katherine Matecki
Attorney, Agent, or Firm—Arthur G. Yeager

[57] ABSTRACT

An apparatus including two automobile tires one mounted above the other with the treads in contact and counterrotating so as to pull a length of electric cable through the line of contact between the tires; a system of sprockets and chains to drive the two tires at the same speed, a system of gears to provide selection of several different rotational speeds of the tires; a housing for each tire, input shafts on the gear system to permit attachment by an electric hand drill to drive the apparatus; the two housings being connected by pivot pins permitting the housings to be opened and closed like a jaw, the pivot pins being readily removable to permit the two housings and their tires to be separated entirely from each other; and a releasable clamp to press the two tires against each other with an adjustable force.

15 Claims, 2 Drawing Sheets

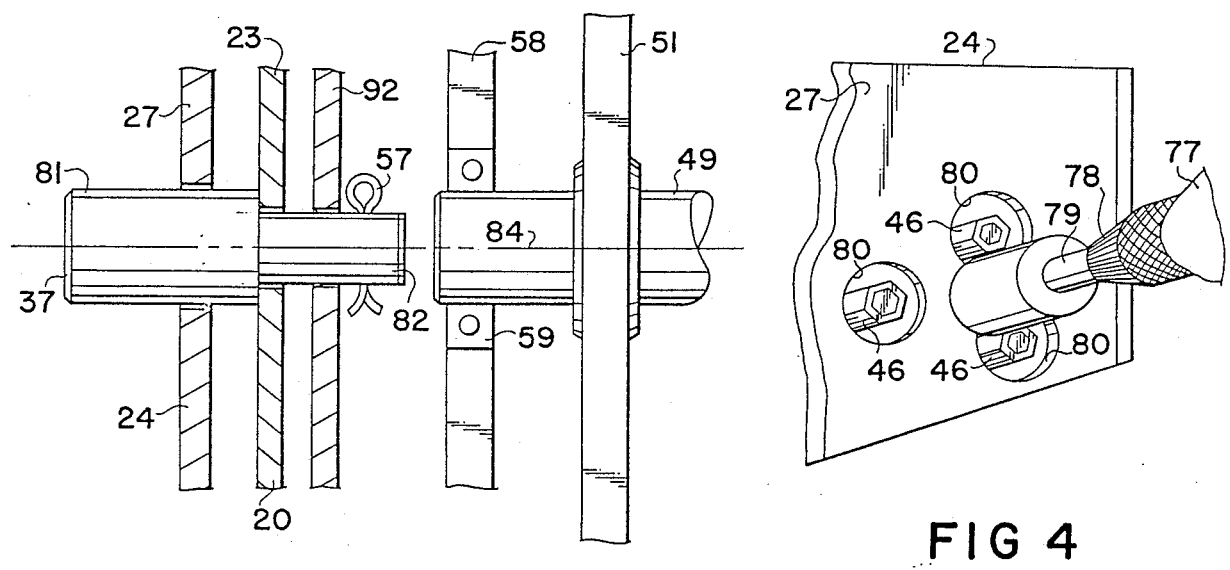
FIG 3
FIG 4
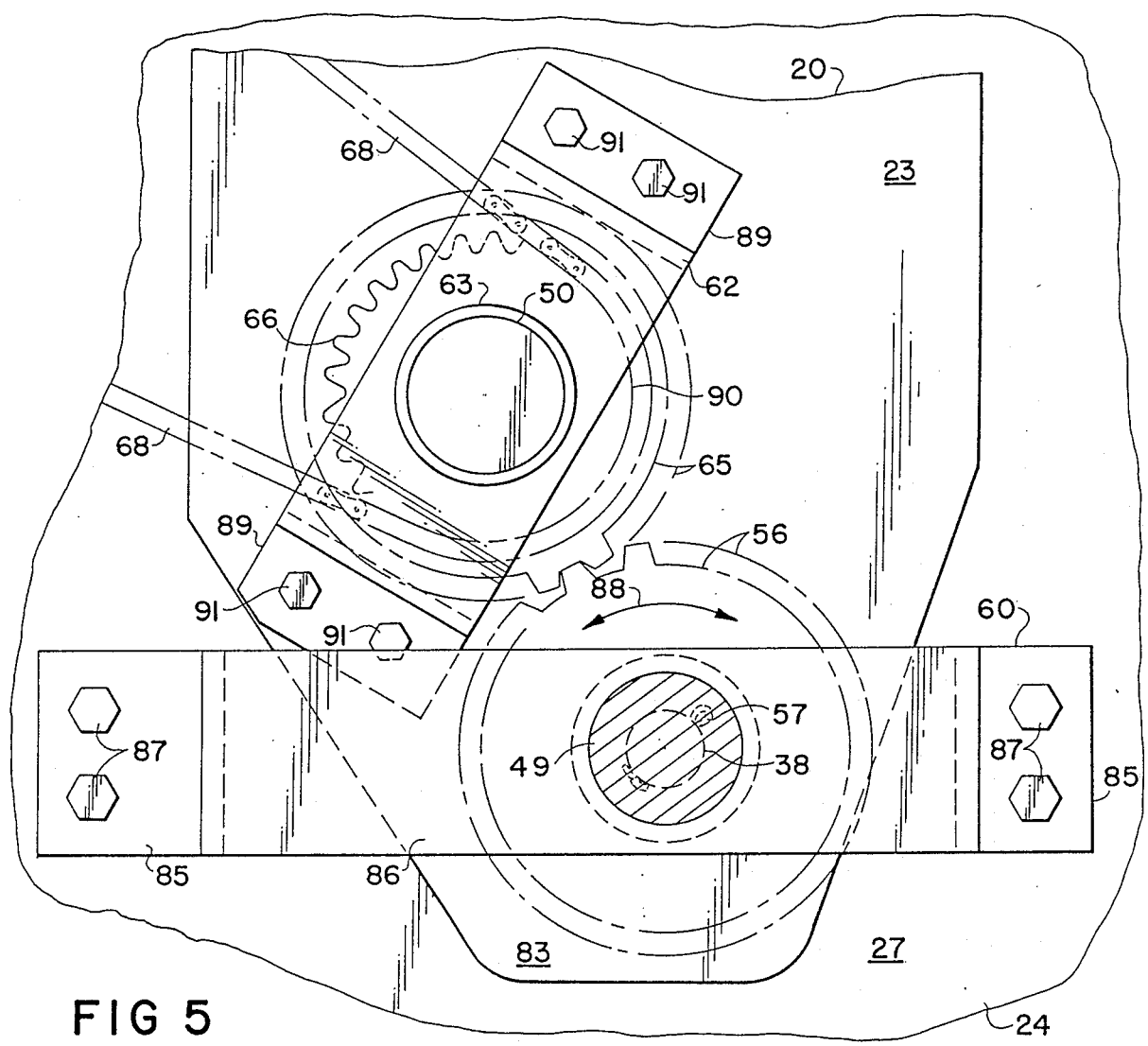
FIG 5

CABLE PULLING DEVICE

BACKGROUND OF THE INVENTION

Power lines and telephone lines require the use of long lengths of cable which in more recent times must be threaded through underground conduits. Generally, the cable has been pulled by workers from a reel of cable or a length of cable had to be pulled by hand through a conduit. The amount of force required to pull a long length of cable is frequently very large because of the weight of the cable and the friction forces of sliding over the ground or through a conduit. Mechanical pulling devices which have been tried include a truck winch or a capstan. These systems have not been satisfactory because of damage to the cable and/or its insulation layer by sharp bending. Hand pulling is frequently not desirable because of the large number of workers needed for heavy cable and the corresponding expense.

It is an object of this invention to provide a novel mechanical cable puller. It is another object of this invention to provide a mechanical cable puller which can be driven with an electric hand drill, and which can be applied to the cable at any place between the ends of the cable. Still other objects will become apparent from the more detailed description which follows.

BRIEF SUMMARY OF THE INVENTION

This invention relates to an apparatus for pulling electric cable which comprises an upper inflated pneumatic tire rotatable about an upper horizontal axis, and a lower inflated pneumatic tire rotatable about a lower horizontal axis wherein both axes are parallel and the central treads of the two tires are in contact and pressed against each other to form a front nip where the two treads move toward each other and a rear nip where the two treads move away from each other; an upper housing in which said upper tire is rotatably mounted on an upper axle and a lower housing in which said lower tire is rotatably mounted on a lower axle; said housings being connected to each other by a pair of pivot pins adapted to permit said upper tire to be lifted away from contact with said lower tire when said upper housing is pivoted upwardly; means for driving said tires in opposite rotational directions at substantially the same speed, and gear means to provide a plurality of selective rotational speeds for said tires.

In specific and preferred embodiments of the invention the pivot pins are easily removable to permit the two housings and their respective tires to be separated from each other; the gear means provides a selection of speeds for the rotating tires, with provision for driving the gear means by an electric hand drill.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a cross sectional view taken at 3—3 of FIG. 2;

FIG. 4 is a schematic perspective view of a portion of the apparatus of this invention showing how it may be driven by a hand held electric drill; and FIG. 5 is a cross sectional view taken at 5—5 of FIG. 2.

DETAILED DESCRIPTION OF THE INVENTION

Figure 1:
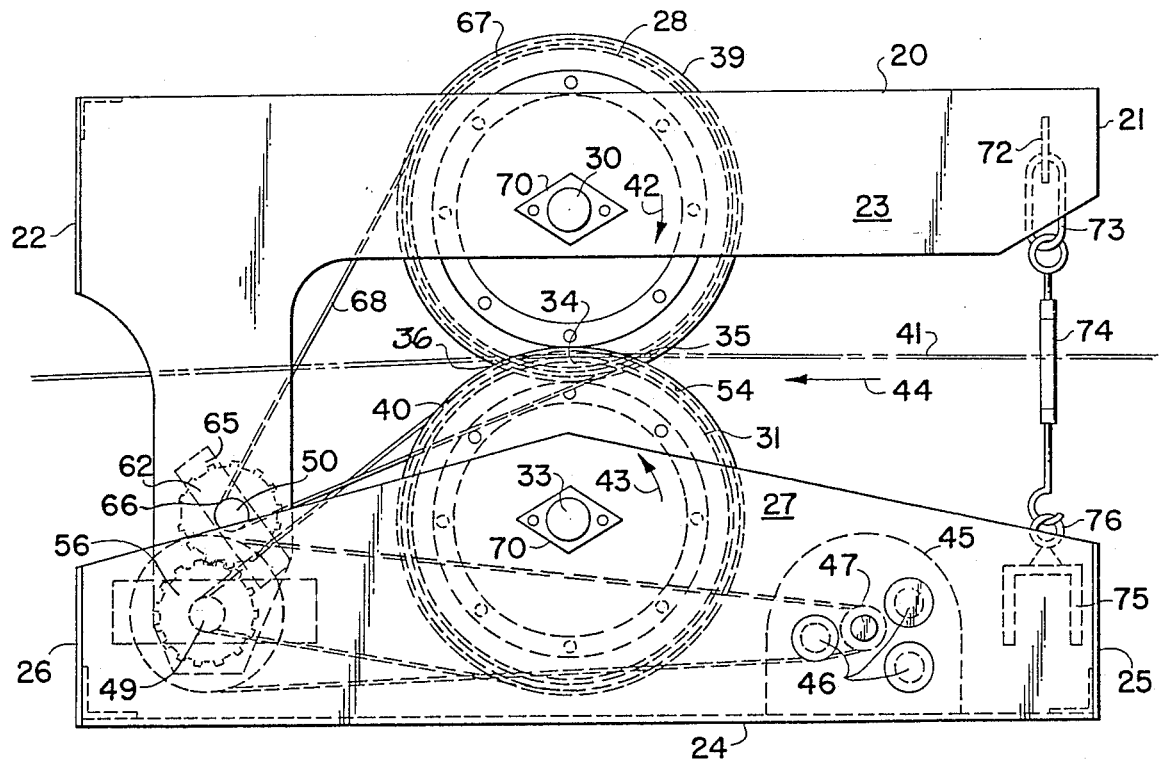
FIG. 1 is a side elevational view of the apparatus of this invention.

The apparatus of this invention may best be appreciated by reference to the attached drawings.

The apparatus of this invention includes an upper tire 28 mounted in an upper housing 20 over and aligned with a lower tire 31 mounted in a lower housing 24. The treads of the two tires 28 and 31 are pressed against each other at a line of contact 34 to form a front nip 35 and a rear nip 36. Actually the pressure between the two tires 28 and 31 is preferably, enough to form a flat area of contact rather than a line of contact but it is intended that 34 represent a line or an area since both are possible depending on the amount of force pressing tires 28 and 31 against each other. The upper housing 20 has a front 21, a back 22 and two spaced vertical sides 23. Similarly, the lower housing 24 has a front 25, a back 26, and two spaced vertical sides 27. Electric cables 41 (shown as dotted imaginary lines) enter from the front 21, 25 of the housings into front nip 35 between the tires 28, 31 in the line or area of contact 34 and leave from rear nip 36 to pass outwardly through the housing back 22, 26 moving in the direction of arrow 44 by the pulling action produced by the rotation of tires 28 and 31 toward each other. The direction of rotation of tire 28 is shown as arrow 42 and of tire 31 is shown as arrow 43. Upper tire 28 is mounted on axle 29 with a pair of bearings 70 to provide free rotation. Lower tire 31 is mounted on an axle 32 with a pair of bearings 70 to provide free rotation. Axles 29 and 32 may each be a single item extending across the respective housing from side to side or may be a pair of stub axles. Either arrangement is suitable so long as each tire is mounted securely and is freely rotatable about its respective axis of rotation 30 and 33 which are parallel to each other and generally perpendicular to sides 23 and 27. Preferably each axle 29 and 32 is mounted in a bushing 69 and a bearing 70.

Tires 28 and 31 are driven by a system of sprockets and chains, and a system of gears to provide a selection of speeds. Gear box 45 has a single output shaft 47 which is turned at different speeds by the application of torque to any of a plurality of input shafts 46. It is preferred to have the capability of operating the apparatus of this invention with a hand held electric drill which may be attached selectively to any of the input shafts 46. A preferred system is shown in FIG. 4 where a hand drill 77 is shown with a chuck 78 and an adaptor 79 secured in the chuck 78. Adaptor 79 may, for example, be a hex head socket wrench head capable of operative connection to any of the hex head ends of input shafts 46. Large passageways 80 are provided in side 27 of lower housing 24 aligned with input shafts 46 such that adaptor 79 may readily be passed through to connect to an input shaft 46.

The driving system to transmit rotational forces to tires 28 and 31 involve a first horizontal shaft 49, a second horizontal shaft 50, gears 56 and 65 to transmit power from shaft 49 to shaft 50, and a plurality of sprockets and chains connecting gear box output shaft 47 to tires 28 and 31. First horizontal shaft 49 extends substantially across the width of lower housing 24 at the back portion 26 from bracket 58 on the left side to bracket 60 on the right side. The directions of left and right are those from the backs 22 and 26 of housings 20 and 24 toward the fronts 21 and 25. Each of brackets 58 and 60 is rigidly affixed to the respective sides 27 of lower housing 24 generally in line with the axis of pivot pins 37 and 38 but spanning over pins 37 and 38 without touching them. In FIGS. 3 and 5 this structure may be seen. Pivot pins (as shown in FIG. 3) are short pins of two diameters, a large portion 81 and a small portion 82. Large portion 81 extends through side 27 of lower housing 24 abutting against side 23 of upper housing 20 and is supported in plate 92. Cotter pin 57 passes through an appropriate transverse hole in small portion 82 prevents pin 37 from being withdrawn until it is desired to do so. When there is a wish to separate upper housing 24 from lower housing 20, cotter pin 57 is withdrawn, permitting pivot pin 37 to be removed and the two housings 20 and 24 to be separated. It is to be understood that exactly the same structure, as a mirror image to that shown in FIG. 3, is employed for the right side of housing 24 and for pivot pin 38. Immediately adjacent to the small portion 82 of pivot pins 37 and 38 are the two ends of first shaft 49 which extends horizontally across the remainder of the width of back 26 of lower housing 24. Preferably, there is a common axis 84 for shaft 49 and pivot pins 37 and 38. Brackets 58 and 60 support the two ends of shaft 49 in respective bearings 59 and 61. Brackets 58 and 60 are rigidly affixed to sides 27 of lower housing 24, and in order to permit pivotal movement of upper housing 20 with respect to lower housing 24 in the vicinity of pivot pins 37 and 38, the lower back 22 of upper housing 20 is narrowed as at 83 in FIG. 5. Brackets 58 and 60 are shallow U-shapes such that their ends 85 lie flat against sides 27 of lower housing 24 and can be bolted thereto as by bolts 87 while the central portion 86 is spaced away from sides 27 so as to permit lower end 83 of sides 23 of upper housing 20 to pivot freely in the directions of arrow 88.

Shaft 49 has mounted thereon sprocket 51 which cooperates with chain 52 and sprocket 48 to transmit rotational forces from gear box output shaft 47 to first horizontal shaft 49. Shaft 49 also has mounted thereon sprocket 53 which in cooperation with chain 55 and sprocket 54 transmits the rotational forces of shaft 49 to lower tire 31. Shaft 49 also has mounted thereon a gear 56 which cooperates with gear 65 to transmit rotational forces to second horizontal shaft 50 which carries sprocket 66 to cooperate with chain 68 and sprocket 67 to turn upper tire 28 in the opposite direction from that of tire 31. Shaft 50 is mounted at the inside end in bearing 63 set in bracket 62 and at the outside end in bearing 64 in side 23 of upper housing 20. Second shaft 50 is short in length as compared to first shaft 49. Bracket 62 is a deep U-shape with its ends 89 lying flat against side 23 of upper housing 20 and with its central portion 90 spaced away from side 23 to permit gear 65 and sprocket 66 to be mounted on shaft 50 and freely rotate within bracket 62. Bolts 91 affix ends 89 securely to side 23 and will pivot therewith when upper housing 20 is pivoted about pin 38.

There are satisfactory alternative devices that can be used in place of those described above as the best mode of embodiment. For example, sprockets and chains may be replaced by pulleys and belts, or by gears. The ultimate driving means may be an internal combustion engine, an electric motor, a pneumatic motor, or the like rather than a hand held electric drill. Gear box 45 may be replaced by a shift transmission or other means of providing a selected speed variation for output shaft 47 transmitting rotational forces to drive the apparatus of this invention. Slip clutch 71 has not been described in detail since any commercially available slip clutch adapted for use on a drive shaft is acceptable for the purpose of interrupting the power train when and if the load of pulling cable becomes too great to be handled by the driving means. Other arrangements and design of pivot pins 37 and 38 may be used so long as they are readily removeable to permit easy separation of upper housing 20 from lower housing 24. This is necessary in order to permit the apparatus of this invention to be connected to one or more parallel lengths of cable without having to feed the ends of the cable or cables into the front nip 35 of the apparatus. If it is possible to feed the ends of the cables into this apparatus, it is merely necessary to open the fronts 21 and 25 of housings 20 and 24 like a jaw in order to insert cables between tires 28 and 31. By separating upper housing 20 from lower housing 24 the center portion of a length of cable may be laid over lower tire 31 at line or area of contact 34 while upper housing 20 is separated from lower housing 24, and thereafter reassemble upper housing 20 to lower housing 24 to make the apparatus operational in pulling the cable. It is, of course, necessary to disengage the necessary chains and sprockets, in order to place the cable on lower tire 31, but this is readily accomplished and need not be described here.

Other clamping means than turnbuckle devices 74 can be used to clamp fronts 21 and 25 together so as to apply the desired pressure between tires 28 and 31. Lever or threaded devices may be used in this location so long as they are readily assembled or disassembled from housings 20 and 24. It is, of course, important to have pivot pins 37 and 38 on opposite sides of tires 28 and 31 from clamping devices 74. This permits the pressure to be applied to line or area of contact 34. Preferably pivot pins 37 and 38 are in the backs 22 and 26 while clamping means 74 are in the fronts 21 and 25.

Figure 2:
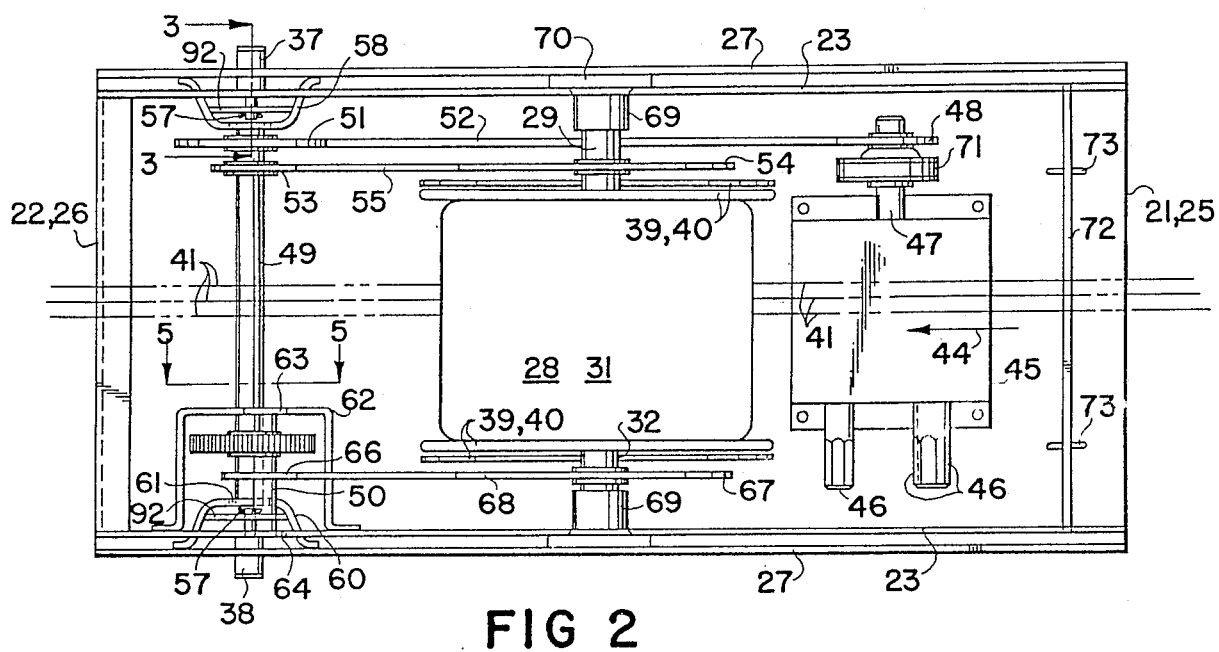
FIG. 2 is a top plan view of the apparatus of this invention.

Tires 28 and 31 may be automotive tires with standard treads although this is not preferred, if there is a possibility of the cables becoming caught in the grooves of the tread. Preferably, the tread area is smooth, without grooves, and is wide enough for 1-6 cables to be laid side-by-side on the tread area. The tires preferably are bounded on each side by discs 39 or 40 which are sufficiently large in diameter to extend a short distance beyond the tread of the tire. These discs 39 and 40 prevent the cables 41 from moving laterally and becoming disengaged by tires 28 and 31. The discs 39 of tire 28 and the discs 40 of tire 31 will not be exactly in line with each other and will overlap as shown in FIG. 2 in order to function properly to keep cables in the tread area.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An apparatus for pulling electric cable which comprises an upper inflated pneumatic tire having a circumferential tread and being rotatable about an upper horizontal axis, and a lower inflated pneumatic tire having a circumferential tread and being rotatable about a lower horizontal axis wherein both axes are parallel and the circumferential treads of the two tires are in contact and pressed against each other to form a front nip where the two treads move toward each other and a rear nip where the two treads move away from each other; an upper housing in which said upper tire is rotatably mounted on an upper axle and a lower housing in which said lower tire is rotatably mounted on a lower axle; said housings being connected to each other by a pair of pivot pins adapted to permit said upper tire to be lifted away from contact with said lower tire when said upper housing is pivoted upwardly; means for driving said tires in opposite rotational directions at substantially the same speed, and gear means to provide a plurality of selective rotational speeds for said tires wherein said gear means includes an input driving shaft and an output driving shaft, and said driving means includes a plurality of sprockets and chains operationally connecting said tires to said output shaft, and a hand drill unit releasably connectable to said input shaft.

2. The apparatus of claim 1 which additionally comprises means for releasably mounting said pivot pins in said housings to permit rapid and easy separation of said housings and their respective tires from each other.

3. The apparatus of claim 1 wherein said gear means includes one said output driving shaft and a plurality of input driving shafts and a plurality of internal gear trains connecting said input driving shafts to said output shaft so as to provide a plurality of rotational speeds to said output shaft.

4. The apparatus of claim 3 wherein each said input driving shaft is fashioned to be operably connectable to a fitting rotatable by operation of said hand drill.

5. The apparatus of claim 1 wherein said tires are automobile tires having grooved treads.

6. The apparatus of claim 1 wherein said tires have wide ungrooved treads.

7. The apparatus of claim 1 wherein said housings have a front portion spaced away from said tires and upstream of said front nip and a rear portion spaced away from said tires and downstream of said rear nip.

8. The apparatus of claim 7 wherein said lower housing additionally includes a first horizontal shaft means having a longitudinal axis parallel to said axles, extending across said rear portion and having mounted thereon sprockets for chain driven connections to said gear means and to said lower tire.

9. The apparatus of claim 8 wherein said upper housing additionally includes a second horizontal shaft means with a longitudinal axis parallel to said axles and having mounted thereon a sprocket for chain driven connection to said upper tire.

10. The apparatus of claim 9 wherein each of said two horizontal shaft means also has mounted thereon a gear operationally connected to each other so that said first shaft means drives said second shaft means.

11. The apparatus of claim 1 which additionally includes a pair of discs affixed to the respective opposite sides of each said tire and having an outer periphery which is greater in diameter than the largest diameter of the tire.

12. The apparatus of claim 1 which additionally includes a removable clamping means to provide the force for pressing each said tire against the other.

13. The apparatus of claim 12 wherein said clamping means is a turnbuckle attachable to said upper housing and said lower housing at a position on the opposite side of said tires from the positions of said pivot pins.

14. An apparatus for pulling a length of insulated electric cable in a lengthwise direction with respect to said length of cable, the apparatus comprising:
   (a) an upper housing and a lower housing each having a front, a back, and two parallel sides, and being fastened together by a pair of pivot pins adjacent said backs of said housings to permit said fronts of said housings to open and close in the manner of a jaw;
   (b) a pair of substantially identical wide tread automotive tires mounted, respectively, one in each of said housings so as to be rotatable about two parallel axes perpendicular to said sides and to be capable of pressing against each other at a line of contact where said respective treads meet;
   (c) sprocket-and-chain means for driving both said tires toward each other at the same speed and adapted to pull said electric cable from said front to said back between said tires;
   (d) driving means for driving said sprocket-and-chain means; including gear means to provide a selection of speeds for driving said sprocket-and-chain means and a plurality of input shafts and a single output shaft from said gear means, said input shafts being structured so as to be operably connectable selectively to an electric hand drill to provide the torque for driving said gear means and said sprocket-and-chain means;
   (e) means to permit rapid and easy manual removal of said pivot pins from said housings to permit separation of said housings and their respective tires from each other; and
   (f) releasable clamping means positioned at said front of said housings to provide the force to press said tires against each other.

15. The apparatus of claim 14 wherein said clamping means comprises a turnbuckle releasably connectable to said fronts of said housings.

* * * * *